Nov. 2, 1971   R. H. SLIWOSKI   3,616,746
FOOD HEATING APPARATUS
Filed July 15, 1970
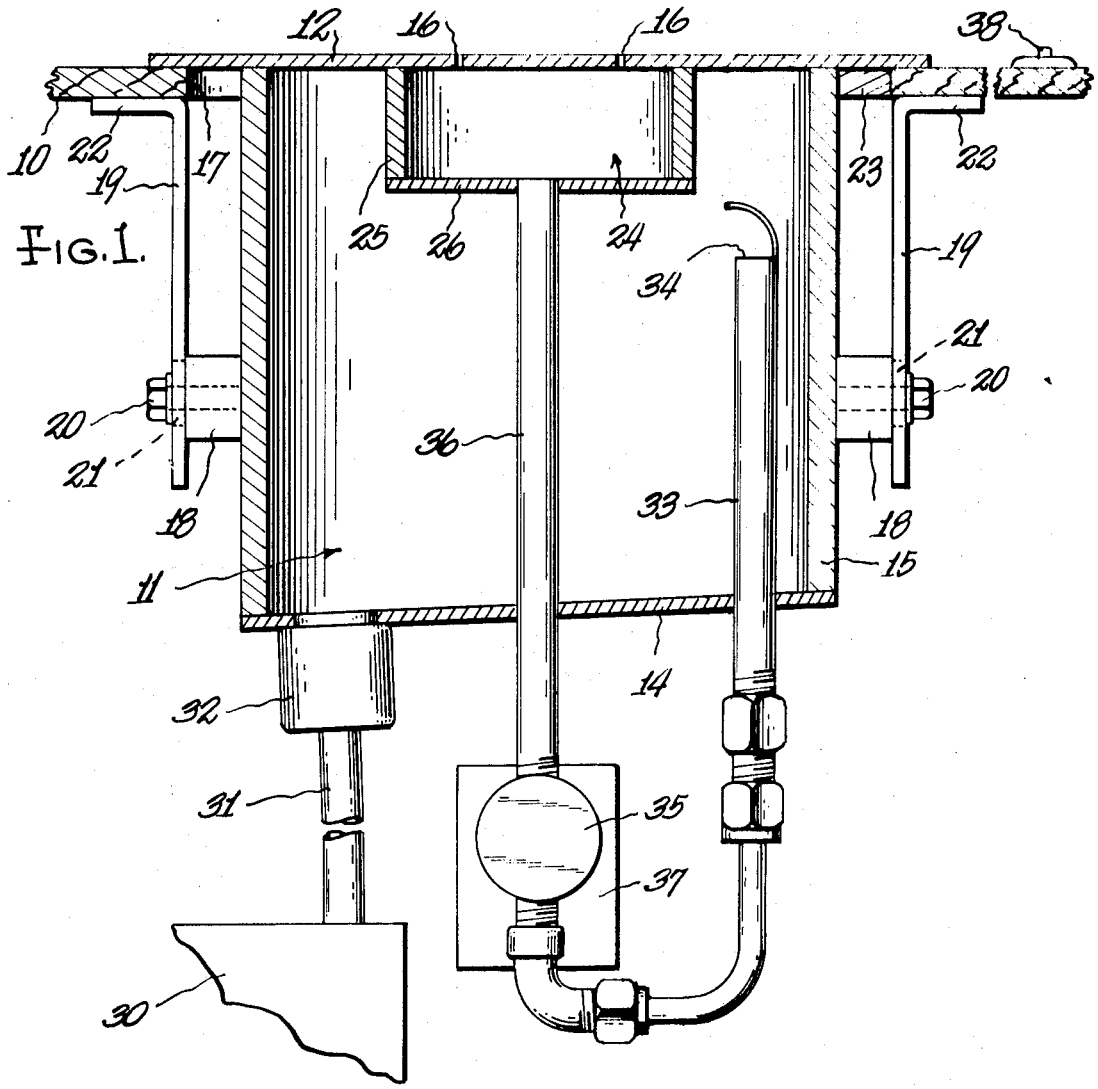
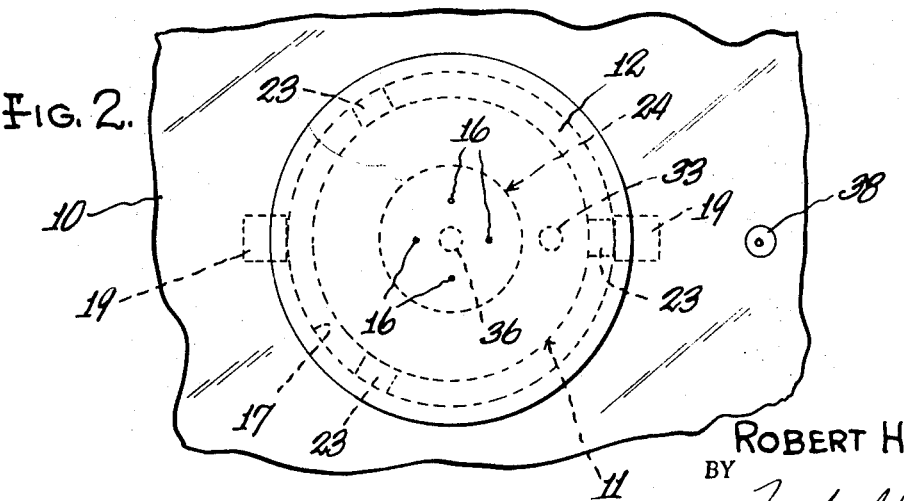
INVENTOR.
ROBERT H. SLIWOSKI
BY
Michael Williams
ATTORNEY

United States Patent Office 3,616,746
Patented Nov. 2, 1971

3,616,746
FOOD HEATING APPARATUS
Robert H. Sliwoski, Rankin, Pa., assignor to
Emerson Electric Co., St. Louis, Mo.
Filed July 15, 1970, Ser. No. 55,107
Int. Cl. B01j 3/00
U.S. Cl. 99—234 R                               7 Claims

ABSTRACT OF THE DISCLOSURE

Food heating apparatus, particularly for warming and freshening rolls and buns, comprising a plate on which the food product is placed, the plate forming the top of a main steam chamber. A dry steam chamber, within the main steam chamber, receives steam from the latter, the steam from the dry steam chamber issuing from through apertures in the top plate to warm the food products thereon. The dry steam chamber is considerably smaller than the main chamber so that steam within the latter maintains the top plate in heated condition.

BACKGROUND AND SUMMARY

The invention has particular usefulness in commercial establishments where bread products, such as hamburger buns and frankfurt rolls are sold in quantity. Normally, such establishments receive delivery of fresh products and store the same for use. However, since deliveries are made over a considerable area, or the products are stored for considerable time, such products become dry and therefore unpalatable. My invention makes it possible to restore such products to fresh-like condition.

Food warmers of the type above-mentioned have been in use for some time but, so far as I am aware, each heated the top plate only at the time steam issued from the openings therein and therefore the top plate remained cold at all other times. My invention makes it possible to heat the top plate by means of the steam in the main chamber and thus utilizes this heat for useful purposes, such as to prevent steam from condensing on a relatively cold top plate and thus entering the food as water instead of steam. Accordingly, the principal object of my invention is to provide new and improved food heating apparatus of the character above specified.

DESCRIPTION OF THE DRAWING

In the drawing accompanying this description and forming a part of this specification there is shown, for purposes of illustration, an embodiment which my invention may assume, and in this drawing:

FIG. 1 is a broken, vertical sectional view through food heating apparatus, illustrating an embodiment of my invention, and FIG. 2 is a top plan view, drawn to a reduced scale.

DESCRIPTION OF PREFERRED EMBODIMENT

The food heating apparatus is herein shown as supported from a counter top 10, or the like, and comprises a main steam chamber 11 including a metal top or hot plate 12, a metal bottom plate 14, and a metal cylindrical side wall 15, and these parts are preferably welded together to form a steam-tight chamber. The top plate 12 is provided with a plurality of holes 16, grouped in a pattern as shown in FIG. 2.

The counter top 10 has an opening 17 of a size larger than the side wall 15 and the latter extends downwardly therethrough. The top plate 12 is of a size larger than the counter top opening 17 and has its undersurface resting on the top surface of the counter top. The side wall 15 has a pair of lugs 18 welded to its outer surface and legs 19 are secured to the lugs by bolts 20. The legs have elongated slots 21 therein so that they may be vertically adjusted to clamp the counter top between a foot 22 and the top plate 12. Also welded to the outer surface of the side wall 15 are three equidistantly spaced lugs 23 which center the cylindrical member within the counter top opening 17. The side wall 15 and bottom plate 14 may be covered with insulation (not shown) to decrease heat dissipation therefrom.

Located within the main steam chamber 11 is a dry steam chamber 24 which communicates with the openings 16 in the top plate 12. The dry steam chamber is materially smaller than the main steam chamber and, as shown in FIG. 1, a considerable area of the top plate 12 is exposed to the heat of the steam within the main steam chamber and is therefore maintained in heated condition, even when no steam is present in the dry steam chamber 24.

The dry steam chamber is herein shown as being of cup-shape, and includes a metal cylindrical side wall 25 and a metal bottom wall 26 welded in fluid-tight relation to the bottom of the side wall 25. The top of side wall 25 is welded to the under surface of the top plate 12, to make the chamber 24 steam tight, except for the small steam escape holes 16.

The dry steam chamber 24 is preferably arranged coaxial with the main steam chamber and the outer diameter of the side wall 25 is about half the inside diameter of the side wall 15 to insure that sufficient area of the top plate 12 is exposed to the heat of the steam within the chamber 11. The length of the side wall 25 is about one-fifth of the length of the side wall 15 so that only a small amount of steam is required in the chamber 24 to issue from the opening 16.

The main steam chamber 11 is supplied with steam from a boiler 30 which is only fragmentarily shown since it may be of any suitable commercially available construction. Preferably, the boiler 30 is of small size so that it will fit beneath the counter top 10. The boiler 30 is provided with suitable safety valves and a pressure control valve (not shown), the latter to control flow of steam to the main steam chamber through a pipe 31 which connects to a fitting 32 welded within an opening in the bottom wall 14.

A conduit is provided for conducting steam from the main chamber 11 to the dry steam chamber 24, and comprises a first portion 33 having a hooded open end 34 disposed adjacent to the top of the main chamber to insure that the steam entering the end 34 will be as dry as possible. The conduit portion 33 extends down through the bottom wall 14 in fluid-tight manner and has connection with one side of a control valve 35. The steam conducting conduit has a second portion 36, the open upper end of which extends through an opening in the bottom wall 26 in fluid-tight manner. The conduit portion 36 extends down through the bottom wall 14 in fluid-tight manner and is connected to the other side of the control valve 35.

The control valve may be operated in any suitable manner, but preferably it is operated by a solenoid 37 which is connected in electrical circuit with a push button switch 38. The switch may be located at any convenient place, and in the disclosed embodiment it is located in the counter top 10 adjacent to the top plate 12, although it may be floor mounted and operated by a foot pedal.

Assuming that steam under sufficient pressure is present in the boiler 30, such steam will flow through the pipe 30 and to the main steam chamber 11 to fill the same and thereby heat the top plate 12. As seen in FIG. 1, the bottom plate 14 is inclined downwardly toward the opening in which the fitting 32 is secured, so that any condensate will flow back to the boiler and will not tend to wet the steam in the main chamber 11.

When the operator presses the button switch 38, the solenoid 37 will be energized and in turn will open the control valve 35, so that dry steam from the upper end of the chamber 11 will enter the conduit 33, flow through the valve 35 and conduit 36, and fill the dry steam chamber 24, the steam from the latter issuing through the openings 16 and contacting the food placed over and adjacent to such openings.

I claim:

1. Apparatus for warming food products, comprising a main steam chamber including a top wall, a bottom wall and a tubular side wall, said stop wall having a plurality of grouped openings therethrough, a second steam chamber within said main chamber the interior of said second steam chamber being in communication with the openings in said top wall, said second steam chamber being materially smaller than said main chamber so as not to obstruct heat transfer of steam in the latter to the top wall thereof, a first conduit for conducting steam to said main steam chamber, a second conduit for conducting steam to said second steam chamber, and valve means in said second conduit for controlling flow of steam from said main chamber to said second chamber.

2. Apparatus for warming food products, comprising a top plate having a series of openings therethrough and on which said food products may be disposed in the vicinity of said openings, a tubular member having its top closed by said top plate and also having a bottom wall closing the lower end thereof, thereby forming a chamber to contain steam, a cup-shaped member having its open upper end closed by said top plate in an area circumscribing the openings in the latter, the peripheral wall of said cup-shaped member being spaced from the inner wall of said tubular member whereby the steam in said chamber at all times heats that portion of said top plate beyond the periphery of said cup-shaped member, a first conduit for admitting steam to the lower end of said chamber, a second conduit for conducting steam from said chamber to the interior of said cup-shaped member for emission from the openings in said top plate to impinge on the food products resting on the latter, and valve means in said second conduit for controlling flow of steam from said chamber to said cup-shaped member.

3. The construction according to claim 2 wherein said apparatus is adapted to be supported from a counter top, the latter having an opening of a size to freely pass said tubular member, said top plate overhanging the latter and resting on the top surface of said counter top.

4. The construction according to claim 3 wherein clamping members are carried by the exterior surface of said tubular member for vertical adjustment, said clamping members having a portion engaging the undersurface of said counter top to clamp the latter between it and the undersurface of said top plate.

5. The construction according to claim 2 wherein said tubular member and the peripheral wall of said cup-shaped member are cylindrical and coaxially arranged, said first conduit admitting steam to said chamber through an opening in the bottom wall thereof, said second conduit comprising a first portion extending from a hooded opening adjacent to the top portion of said chamber and downwardly through said bottom wall in fluid tight relation, and a second portion extending upwardly through said bottom wall in fluid-tight relation and upwardly and axially of said chamber and terminating in fluid-tight relation in the bottom wall of said cup-shaped member, a solenoid valve controlling flow of steam from said chamber and through said first and second portions, and a push bottom switch for controlling operation of said solenoid valve.

6. The construction according to claim 5 wherein the exterior diameter of the peripheral wall of said cup-shaped member is about one-half the internal diameter of said tubular member.

7. The construction according to claim 2 wherein the bottom wall of said tubular member inclines downwardly and said first conduit opens into said chamber at the lowermost portion of said bottom wall.

References Cited

UNITED STATES PATENTS

| | | | |
|---|---|---|---|
| 2,181,434 | 11/1939 | Lewis et al. | 99—234 A UX |
| 2,617,349 | 11/1952 | Tucker | 99—234 A |
| 3,291,030 | 12/1966 | Arnold | 99—419 X |
| 3,307,473 | 3/1967 | Clifford et al. | 99—234 A |
| 3,358,581 | 12/1967 | Harris | 126—33 X |

WALTER A. SCHEEL, Primary Examiner

A. O. HENDERSON, Assistant Examiner

U.S. Cl. X.R.

126—33